United States Patent [19]

Brugner, Jr.

[11] E Patent Number: Re. 31,846

[45] Reissued Date of Patent: Mar. 12, 1985

[54] SILVER, CADMIUM OXIDE, LITHIUM CARBONATE CONTACT MATERIAL AND METHOD OF MAKING THE MATERIAL

[75] Inventor: Frank S. Brugner, Jr., Clearwater, Fla.

[73] Assignee: Square D Company, Palatine, Ill.

[21] Appl. No.: 487,630

[22] Filed: Apr. 22, 1983

Related U.S. Patent Documents

Reissue of:

[64] Patent No.: 4,293,337
Issued: Oct. 6, 1981
Appl. No.: 68,038
Filed: Aug. 20, 1979

[51] Int. Cl.[3] ..... B22F 3/00; C22C 29/00

[52] U.S. Cl. ..... 75/232; 419/21

[58] Field of Search ..... 419/21; 75/232

[56] References Cited

U.S. PATENT DOCUMENTS

| | | | |
|---|---|---|---|
| Re. 29,986 | 5/1979 | Davies et al. | 419/21 |
| 3,954,459 | 5/1976 | Schreiner et al. | 419/21 |
| 3,969,112 | 7/1976 | Kim et al. | 419/21 |
| 4,011,052 | 3/1977 | Davies | 419/19 |
| 4,011,053 | 3/1977 | Davies | 419/19 |
| 4,028,063 | 6/1977 | Kim et al. | 75/234 |
| 4,056,365 | 11/1977 | Bevington et al. | 419/21 |
| 4,095,977 | 6/1978 | Brugner | 75/234 |
| 4,098,724 | 7/1978 | Douglas et al. | 419/21 |

FOREIGN PATENT DOCUMENTS 1524074 9/1978 United Kingdom .

*Primary Examiner*—Benjamin R. Padgett
*Assistant Examiner*—Anne Brookes
*Attorney, Agent, or Firm*—William H. Schmeling; Richard T. Guttman

[57] ABSTRACT

A material and a process for use in making electrical contacts. The material is produced in powder form suitable for later processing into electrical contacts by standard metallurgical techniques generally involving compacting the powdered material to form a compact that preferably has a backing of metallic silver, sintering the compact to form the contact having a fine sintered silver backing and forming or cutting the contact to make it to the desired shape and size. The material, and in most general applications the contact made from the material, essentially consists of silver, approximately 15% cadmium oxide by weight, and lithium carbonate at a proportion of about 0.005 weight percent of lithium, which is approximately equal to 0.04 molecular percent of lithium carbonate. The lithium carbonate is added to the powder mixture of silver and cadmium oxide powder mixture as a solution which is thoroughly mixed with the powders to form a slurry to uniformly distribute the lithium carbonate on the surfaces of the powder particles of cadmium oxide and silver by precipitation. The slurry is then dried and precipitated material is pulverized and formed into a compact without reducing the lithium carbonate prior to sintering of the compact. Thus by using lithium carbonate instead of lithium nitrate as known in the prior art, the step of reducing the lithium nitrate to lithium oxide prior to sintering the contact material is eliminated without sacrificing the performance of the contact material.

19 Claims, 3 Drawing Figures

SILVER, CADMIUM OXIDE, LITHIUM CARBONATE CONTACT MATERIAL AND METHOD OF MAKING THE MATERIAL

Matter enclosed in heavy brackets [ ] appears in the original patent but forms no part of this reissue specification; matter printed in italics indicates the additions made by reissue.

This invention relates to electrical contacts for making and breaking low to medium power circuits and more particularly to the metallurgical composition and the method of making such contacts.

It is well known in the prior art to make electrical contacts from a conductive material and an added material that provides embrittlement qualities to the contact. Typically, silver cadmium oxide mixtures are used for most medium and low alternating electrical power switching applications. Recently such electrical contacts have been improved, particularly with respect to the erosion rate, by the addition of a third material having a low electronic work function, such as lithium, preferably in the form of lithium oxide. The material and the method of making the material so that the lithium oxide is uniformly distributed throughout the material is disclosed and claimed in U.S. Pat. Nos. 4,011,053 and 4,011,052, which issued on Mar. 8, 1977 and are assigned by the patentee T. A. Davies to the assignee of the present invention. A more recent development in the art of making silver, cadmium oxide and lithium oxide contact materials is disclosed in U.S. Pat. No. 4,095,977 which issued on June 20, 1978 and is assigned by the patentee F. S. Brugner to the assignee of the present invention. The Brugner patent, as combined with the Davies patents, discloses that if a minute critical amount of lithium oxide is present in the silver cadmium oxide contact material and is uniformly distributed therein, an unexpected dramatic increase in the contact life is achieved.

When the teachings of Davies and Brugner are followed, a contact material is produced that has vastly superior erosion resistance characteristics and these characteristics are produced by adding an unexpected small amount of low electronic function material to achieve the maximum benefit. It has been thus established that maximum resistance to erosion of a contact can be obtained by carefully selecting the material and the percentage of low electronic work function material in the form of an oxide of the material, which is uniformly distributed in a silver cadmium oxide contact.

Silver cadmium oxide powdered metal contacts usually are provided with a backing of fine metallic silver which is attached to a highly conductive metal support, such as copper, by a suitable method such as silver-soldering method. When the contacts are produced according to the methods heretofore known, as exemplified by the Davies patents, a solution containing a compound that is reducible to lithium oxide is usually introduced into the powdered contact material to form a slurry which is subsequently treated to change the lithium compound to lithium oxide which is precipitated upon the particles of silver cadmium oxide. In the event that the step of reducing the compound of lithium to lithium oxide is not incorporated into the process, or the reduction to lithium oxide is incomplete, when the fine silver powdered backing is placed upon the material and the contacts are sintered to form the individual contacts, blisters are formed due to decomposition of the reducible lithium compound and subsequent gas entrapment forms between the fine silver backing and the contact material, as illustrated in the drawings. When the contacts are formed according to the present invention, lithium is introduced into the contact material in the form of lithium carbonate which is dissolved in a suitable solvent, e.g., water. The silver cadmium oxide powdered particles are mixed in the solution to form a slurry which is subsequently dried to eliminate the step in the prior art process which requires the lithium oxide compound to be produced by the formation of lithium oxide from some other lithium compound before the fine silver backing is applied. When the dried silver cadmium oxide powder containing lithium carbonate powder is compressed and the silver powder backing placed thereon, the sintering of the contact will not cause entrapment of gas and blisters to appear between the silver layer and the contact material so that the silver layer remains substantially flat, as shown in the drawings, and an excellent bond may be achieved between the contact material and the copper backing when it is attached as previously described.

The objects and other advantages of this invention will appear from the following description.

Figure 1:
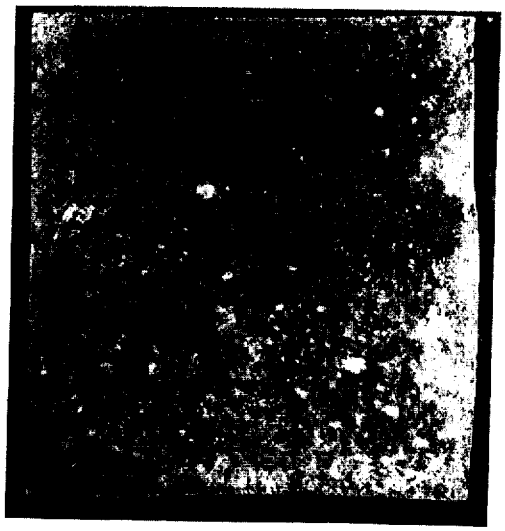
FIG. 1 is a plan photographic view of a contact formed of pure silver.

In each of the specimens shown in the photographs the silver powder is of the type known as "Fine Silver Powder Type O" which may be obtained from the Metz Metallurgical Corporation located at Plainfield, New Jersey, U.S.A. As specified, the Type O fine silver powder has an apparent density of 6.8 grams per cubic inch and 100% of the powder will pass through a 200 mesh screen.

In accordance with this invention, material for use in making electrical contacts is produced by standard metallurgical or other suitable techniques. Since it is known that silver is a preferred metal and cadmium oxide is a preferred high percentage additive, materials selected for tests comprised 85% silver and 15% cadmium oxide by weight. This material is known to produce good contacts and was produced with a powder process. While any process using the same basic constituents would produce improved results, the prior art indicates that material made by a powder process using an internal oxidizing procedure would produce the greatest improvement.

To produce contacts according to the invention, a powder is made by mixing a first and second starting material in the desired proportions. The first starting material is silver powder as above described. The second starting material is cadmium oxide powder having particles in the size range of 0.01 to 2 microns in diameter. The two powders are dry tumble mixed in a drum and the finally mixed powders are sieved through a 40 micron screen.

The sieved powder is heated in a highly reducing atmosphere of hydrogen to convert the cadmium oxide to cadmium by placing it in a furnace at a temperature of about 200° to 700° C. The powder is spread to a depth of about one centimeter. The temperature is kept below the melting temperature of the resulting alloy that would be produced by the proportion of silver and cadmium present to prevent forming of a melt and alloying occurs as the cadmium dissolves or diffuses into the silver particles.

The resulting alloyed material is mechanically broken down and sieved through a 500 micron screen to produce an alloy in a powder or particle form. The sieved alloy powder is then heated in an oxidizing atmosphere at a temperature low enough to prevent the forming of a melt and high enough to assure complete internal oxidation. The oxidized alloy material is then sieved to a degree of fineness appropriate for making contacts as known.

A third starting material, which preferably is a lithium carbonate compound and is known as a low work function metal material, is dissolved in a suitable solvent, e.g., water, to form a solution. The solution is then mixed with the oxidized alloy to form a slurry. Percentages of the materials in the slurry are selected to reach the desired end result and the slurry is then dried to produce an internally oxidized silver cadmium alloy powder with small crystals of the lithium carbonate compound of the low work function material formed on the surface of the powder particles. The dry powder mixture is then sieved through a suitably sized screen to break up any large cakes of material formed during drying to produce a powdered material having particle sizes suitable for making contacts.

The contacts are processed by typical metallurgical techniques involving compressing the material to form a compact body, sintering the body at a temperature of approximately 900° C., which is less than the dissolution temperature of lithium carbonate, and coining the sintered body for the final shape and size required for the contacts.

Contacts fabricated to contain lithium carbonate according to the process of the present invention exhibited substantially the same resistance to erosion as the contacts containing lithium oxide as disclosed in the Brugner patent when the amount of lithium additive in the two different contacts were substantially equal. However, to form the lithium oxide as disclosed in the Brugner patent required the additional step wherein the lithium oxide was formed from a reduced lithium compound. This step has been eliminated in the method according to the present invention without reducing the effectiveness of the lithium in the final contact product.

It has been previously indicated that the lithium metal is a low electronic work function material. The theory of operation of the low electronic work function material in the performance of the contact material is fully disclosed in the Brugner patent and therefore is incorporated herein by reference and further explanation of the operation of the material is not believed necessary as it is now well known to those skilled in the art. This patent, which is known as the Brugner patent, discloses that if a minute critical amount of lithium oxide is present in the silver cadmium oxide contact material and is uniformly distributed therein, an unexpected dramatic increase in the contact life is achieved.

Thus, when the teachings of Davies and Brugner are followed, the contact material produced has vastly superior erosion characteristics. These erosion resistance characteristics are provided by the addition of an unexpected small amount of a low electronic function material to achieve the maximum benefit. It has been thus established according to the present invention that maximum resistance to erosion is obtained by carefully selecting the proper percentage of low electronic work function material in a stable lithium carbonate compound form that does not require a chemical modification of a lithium oxide form to achieve the desired end result; that is, forming an electrical contact that is highly resistant to electrical erosion.

The following example illustrates the manner in which the method according to the present invention may be carried out as applied to the manufacture of a silver-cadmium-oxide contact material including lithium carbonate with the cadmium oxide and the lithium carbonate present in precise amounts and uniformly distributed throughout the contact material. Initially, 200 grams of a silver-cadmium oxide powder containing 15% cadmium oxide and 85% silver as formed by the reduction and subsequent oxidation process as disclosed in the Davies and Brugner patents supra was weighed into a glass beaker and 0.058 grams of lithium carbonate ($Li_2CO_3$) powder was weighed on a stainless steel dish on a microbalance. The stainless steel dish and lithium carbonate powder was then placed into a clean Teflon beaker and rinsed with redistilled water for about one minute to remove all extraneous matter and contaminants. Redistilled water was then introduced in the beaker to a level of approximately ¼ inch above the bottom of the beaker. The beaker and its contents was placed in a freezing environment for a short time (approximately 15 minutes) to increase the solubility of lithium carbonate in the water. The beaker was removed from its freezing atmosphere and the solution was mixed to dissolve the $Li_2CO_3$ in water which solution was added to the previously formed Ag-CdO powder in the glass beaker. The Teflon beaker was rinsed with redistilled water into the glass beaker and additional redistilled water was added to the glass beaker to form a slurry of the contents within the glass beaker. The slurry was thoroughly mixed and the glass beaker was covered with a watch glass and placed in a 60° C. oven for eight hours to dry the contents in the beaker. After the powdered material was thoroughly dry, any lumps of material which may have been formed during the process were broken up and the material was passed through a 100 mesh screen for processing into electrical contacts according to well known metallurgical techniques as described, supra.

Figure 2:
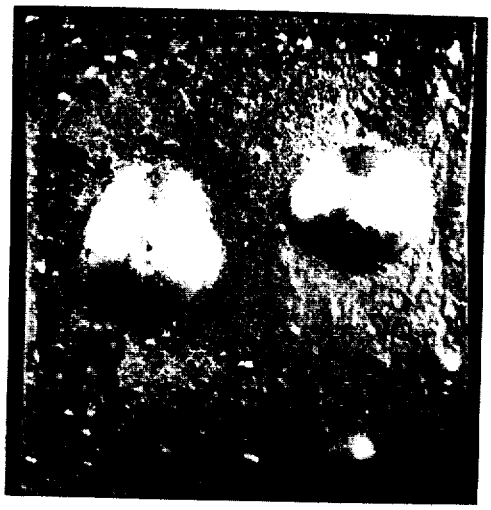
FIG. 2 is a plan photographic view of a contact formed of pure silver with 300 parts per million of lithium added in the form of lithium nitrate to the silver powder.
Figure 3:
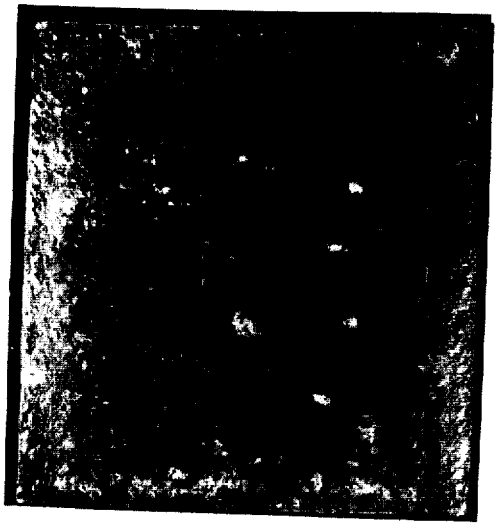
FIG. 3 is a plan photographic view of a contact formed of pure silver with 300 parts per million of lithium added in the form of lithium carbonate to the silver powder.

The photographs, FIGS. 1-3, clearly demonstrate the marked differences when lithium nitrate and lithium carbonate is added to a fine silver powder. The photographs shown contacts not containing cadmium oxide and each was taken after Metz Type O fine silver powder was compressed under 30,000 psi and sintered for one hour at 920° C. Each of the photographs was taken with a 65 mm lens with an aperture opening of 6 to provide a magnification of 5 times the size of the contact photographed. The contact in FIG. 1, which was formed of a fine silver powder, was photographically exposed for ⅛ of a second. The contacts in FIGS. 2 and 3 each have 300 ppm Li added thereto and were photographically exposed for 1/30 of a second. Lithium additive in FIG. 2 is lithium nitrate ($LiNO_3$) and the additive in FIG. 3 is lithium carbonate ($Li_2CO_3$). The 300 ppm which was added for demonstration purposes is far greater than the amounts recommended in the Brugner patent, supra.

As shown in the photographs, when contact material containing $LiNO_3$ having a fine silver powder backing is compressed and sintered at a temperature of 920° C. or above, which is required to cause proper sintering of the contact material, the temperature will be greater than 600° C. which is the decomposition temperature of $LiNO_3$ and gas blisters will form between the contact material and the sintered silver backing. Note in FIG. 2 the two blisters which were formed by trapped gas as the $LiNO_3$ decomposed to form $Li_2O$ are particularly prominent. In contrast, when $Li_2CO_3$, which melts at 723° C. and decomposes at 1310° C. is added to the contact material and the material is compressed and sintered at a temperature of 920° C., the lithium carbonate will melt at 723° C. but not decompose and blisters will not form, as illustrated by FIG. 3 which shows the same characteristics as illustrated by the contact in FIG. 1 which is made of fine silver without any additives.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A process of forming an improved electrical contact for electrical power applications and made with a first starting material selected from a group essentially consisting of a first metal in powder form and reducible compounds of the first metal in powder form both having a selected maximum particle size, and with a second starting material selected from a group essentially consisting of a second metal in powder form, reducible compounds of the second metal in powder form, and mixtures of the second metal in powder form all having a selected maximum particle size with said second metal selected to be more readily oxidizable than the first metal under similar environmental conditions and added in an amount from a minimum effective amount up to the maximum limit of solubility of the second metal in the first metal by mixing the first and second starting materials together to obtain a mixture having a substantially even dispersion of the first and second starting materials, heating the mixture in a reducing atmosphere at a temperature below the melting temperature of the alloy of the first and second metals in the proportions present to alloy the first and second metals in a powder form; sieving the alloyed mixture to produce a selected maximum particle size; heating the sieved mixture in an oxidizing atmosphere at a temperature and under conditions selected to substantially completely oxidize the second metal and with said temperature below the melting temperature of the alloy of the first and second metals in the proportions present to thereby maintain the *oxidized* mixture in a powder form; and sieving the oxidized mixture to produce a *powdered material having a* selected maximum particle size, said process comprising adding at a selected time during the process lithium [metal] in the form of lithium carbonate particles with the lithium carbonate particles uniformly distributed throughout *the powdered* material, forming a compact of the powdered material to provide an electrical contact having *uniformly distributed constituents and* a desired shape, size and density, and sintering the compact for a predetermined time at a temperature less than the decomposition temperature of the lithium carbonate to provide a sintered electrical contact.

2. The process as recited in claim 1 wherein a layer of silver powder is added to one side of the compact before the compact is sintered to provide the contact with a silver backing.

3. The process as recited in claim 1 wherein the first metal is silver and the second material is cadmium oxide.

4. The process as recited in claim 1 wherein the first metal is silver, the second material is cadmium oxide, the lithium carbonate is dissolved in a suitable solvent to form a solution, mixing the oxidized powder mixture in the solution to form a slurry having a selected consistency and a selected solution to obtain a uniform distribution of a selected proportion of lithium *carbonate* in the contact material.

5. The process as recited in claim 2 wherein the first metal is silver and the second material is cadmium oxide.

6. A sintered electrical contact for use as switching contacts in power circuits consisting essentially of silver, cadmium and lithium with silver present in a metallic form, the cadmium present as cadmium oxide and the lithium present as lithium carbonate[.] *that is uniformly distributed throughout the contact material in an amount of 0.001 to 0.01 weight percent of the contact material.*

7. An electrical contact as recited in claim 6 wherein the cadmium oxide is selected to impart desired embrittlement qualities to the contact and is added from a minimum effective amount up to a maximum equal to the limit of solubility of the cadmium in the silver.

8. An electrical contact as recited in claim [7] *6* wherein the contact consists of approximately 85 weight percent silver[,] *and* 15 weight percent cadmium oxide [and 0.01 to 0.001 weight percent lithium].

9. An electrical contact as recited in claim 7 wherein the contact consists of approximately 85 weight percent silver, 15 weight percent cadmium oxide and approximately 0.005 weight percent lithium.

[10. An electrical contact as recited in claim 6 wherein the contact consists of approximately 85 weight percent silver, 15 percent cadmium oxide and 0.01 to 0.001 weight percent lithium.]

[11. An electrical contact as recited in claim 6 wherein the contact consists of approximately 85 weight percent silver, 15 weight percent cadmium oxide and approximately 0.005 weight percent lithium.]

12. The electrical contact as recited in claim 6 wherein the silver, cadmium oxide and lithium carbonate *respectively* are particles of uniform size and uniformly distributed throughout the contact material.

*13. A process of forming an improved electrical contact for electrical power applications and made with a first starting material selected from a group essentially consisting of a first metal in powder form and reducible compounds of the first metal in powder form both having a selected maximum particle size, and with a second starting material selected from a group essentially consisting of a second metal in powder form, reducible compounds of the second metal in powder form and mixtures of the second metal in powder form all having a selected maximum particle size with said second metal selected to be more readily oxidizable than the first metal under similar environmental conditions and up to the maximum limit of solubility of the second metal in the first metal by mixing the first and second starting materials together to obtain a*

*mixture having a substantially even dispersion of the first and second starting materials, heating the mixture in a reducing atmosphere at a temperature below the melting temperature of the alloy of the first and second metals in the proportions present to alloy the first and second metals in a powder form; sieving the alloyed mixture to produce a selected maximum particle size; heating the sieved mixture in an oxidizing atmosphere at a temperature and under conditions selected to substantially completely oxidize the second metal and with said temperature below the melting temperature of the alloy of the first and second metals in the proportions present to thereby maintain the mixture in a power form; and sieving the oxidized mixture to produce a selected maximum particle size, said process comprising adding at a selected time during the process comprising adding at a selected time during the process 0.001 to 0.01 weight percent of lithium with the lithium present in the material in the form of lithium carbonate particles that are uniformly distributed throughout the powdered material, forming a compact of the powdered material to provide an electrical contact having a desired shape, size and density, and sintering the compact for a predetermined time at a temperature less than the decomposition temperature of the lithium carbonate to provide a sintered electrical contact.*

*14. The process as recited in claim 13 wherein a layer of silver powder is added to one side of the compact before the compact is sintered to provide the contact with a silver backing.*

*15. The process as recited in claim 13, wherein the first metal is silver and the second material is cadmium oxide.*

*16. The process as recited in claim 13 wherein the first metal is silver, the second material is cadmium oxide, the lithium carbonate is dissolved in a suitable solvent to form a solution, mixing the oxidized powder mixture in the solution to form a slurry having a selected consistency to obtain a uniform distribution of a selected proportion of lithium carbonate in the contact material.*

*17. The process as recited in claim 14 wherein the first metal is silver and the second material is cadmium oxide.*

*18. The electrical contact as recited in claim 8 wherein the silver, cadmium oxide and lithium carbonate respectively are particles of uniform size and uniformly distributed throughout the contact material.*

*19. The electrical contact as recited in claim 9 wherein the silver, cadmium oxide and lithium carbonate respectively are particles of uniform size and uniformly distributed throughout the contact material.*

*20. A process of forming an electrical contact for electrical power applications and made with a first starting material selected from a group essentially consisting of a silver in powder form and reducible compounds of silver in powder form both having a selected maximum particle size, and with a second starting material selected from a group essentially consisting of a cadmium in powder form, reducible compounds of cadmium in powder form, and mixtures of the cadmium and cadmium compounds in powder form all having a selected maximum particle size with the cadmium and cadmium compounds selected to be more readily oxidizable than the silver and silver compounds under similar environmental conditions and added in an amount from a minimum effective amount to the maximum limit of solubility of the cadmium in the silver by mixing the first and second starting materials together to obtain a mixture having a substantially even dispersion of the first and second starting materials, heating the mixture in a reducing atmosphere at a temperature below the melting temperature of the alloy of the silver and cadmium in the proportions present to alloy the silver and cadmium in a powder form; sieving the alloyed mixture to produce a selected maximum particle size; heating the sieved mixture in an oxidizing atmosphere at a temperature and under conditions selected to substantially completely oxidize the cadmium and with said temperature below the melting temperature of the alloy of the silver and cadmium in the proportions present to thereby maintain the mixture in a powder form; and sieving the oxidized mixture to produce a selected maximum particle size, said process comprising adding at a selected time during the process 0.001 to 0.01 weight percent of lithium in the form of lithium carbonate particles* [with] *to the mixture to provide a material having* the lithium carbonate particles uniformly distributed throughout the material, forming a compact of the powdered material to provide an electrical contact having a desired shape, size and density, and sintering the compact for a predetermined time at a temperature less than the decomposition temperature of the lithium carbonate to provide a sintered electrical contact.

*21. The process as recited in claim 20 wherein a layer of silver powder is added to one side of the compact before the compact is sintered to provide the contact with a silver backing.*

* * * * *